United States Patent
Fukui et al.

(10) Patent No.: US 12,050,826 B2
(45) Date of Patent: Jul. 30, 2024

(54) INFORMATION PROCESSING DEVICE OUTPUTTING DISPLAY SIGNAL TO DISPLAY IMAGE ILLUSTRATING THAT FIRST AND SECOND IMAGES ARE ARRANGED TO DISPLAY IN LAYERS AND TO BE OVERLAID WITH A GAP IN A THICKNESS DIRECTION FOR CREATING PRINT LABELS

(71) Applicant: BROTHER KOGYO KABUSHIKI KAISHA, Nagoya (JP)

(72) Inventors: Tomoyasu Fukui, Inuyama (JP); Ryuichi Kanda, Nagoya (JP); Yosuke Ohashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/162,135

(22) Filed: Jan. 31, 2023

(65) Prior Publication Data
US 2023/0289121 A1 Sep. 14, 2023

(30) Foreign Application Priority Data
Mar. 8, 2022 (JP) ................. 2022-035642

(51) Int. Cl.
  *G06F 3/12* (2006.01)
  *H04N 1/387* (2006.01)
(52) U.S. Cl.
  CPC .......... *G06F 3/1256* (2013.01); *G06F 3/1208* (2013.01); *G06F 3/1243* (2013.01); *H04N 1/387* (2013.01)

(58) Field of Classification Search
None
See application file for complete search history.

(56) References Cited

U.S. PATENT DOCUMENTS

| | | | |
|---|---|---|---|
| 8,130,406 B2* | 3/2012 | Yano | H04N 1/00278 358/1.18 |
| 2005/0179926 A1* | 8/2005 | Nishikawa | G06F 3/1285 358/1.18 |

(Continued)

FOREIGN PATENT DOCUMENTS

JP          2010-17937 A        1/2010

OTHER PUBLICATIONS

Machine Translation in English of JP Pub 2010-017937 to Kagohara Mikihiro.*

*Primary Examiner* — Haris Sabah
(74) *Attorney, Agent, or Firm* — KENEALY VAIDYA LLP

(57) ABSTRACT

A non-transitory computer readable storage medium stores a set of program instructions executed by a computer included in an information processing device. The set of program instructions includes: acquiring first print data representing a first image; acquiring second print data representing a second image; outputting a first print instruction to print the first image on a first print medium; outputting a second print instruction to print the second image on a second print medium; and outputting, to a display, a display signal to display a multilayer illustrating image illustrating that the first image and the second image are arranged in layers after the outputting the first print instruction and the outputting the second print instruction are performed.

19 Claims, 10 Drawing Sheets

(56) References Cited

U.S. PATENT DOCUMENTS

| | | | |
|---|---|---|---|
| 2019/0250866 A1* | 8/2019 | Arakawa | G06F 3/1285 |
| 2019/0370619 A1* | 12/2019 | Ohashi | G06K 15/024 |
| 2021/0166284 A1* | 6/2021 | Kobayashi | G06F 3/1203 |
| 2022/0063312 A1* | 3/2022 | Goto | B41J 2/07 |
| 2022/0075576 A1* | 3/2022 | Suzuki | G06F 3/1256 |

* cited by examiner

<PRINTING DEVICE>

EDITING PRINT DATA 1, AND PRINTING PRINT DATA 1 TO CREATE LABEL  L1

EDITING PRINT DATA 2, AND PRINTING PRINT DATA 2 TO CREATE LABEL  L2

COMPOSITE IMAGE  PI

OVERLAYING GUIDE IMAGE

INFORMATION PROCESSING DEVICE OUTPUTTING DISPLAY SIGNAL TO DISPLAY IMAGE ILLUSTRATING THAT FIRST AND SECOND IMAGES ARE ARRANGED TO DISPLAY IN LAYERS AND TO BE OVERLAID WITH A GAP IN A THICKNESS DIRECTION FOR CREATING PRINT LABELS

REFERENCE TO RELATED APPLICATIONS

This application claims priority from Japanese Patent Application No. 2022-035642 filed on Mar. 8, 2022. The entire content of the priority application is incorporated herein by reference.

BACKGROUND ART

Conventionally, a user created a label with a desired appearance by printing images on a plurality of tapes using a tape printing device and then overlaying the printed tapes in their thickness direction.

With the conventional technology described above, images are printed on a plurality of individual tapes, after which the user overlays these tapes to create a composite label. However, if the user overlaps the tapes, i.e., the printed matter, in an incorrect order, the resulting composite label will have a different appearance from the desired appearance.

In view of the foregoing, it is an object of the present disclosure to provide a technology for facilitating a user in understanding how a plurality of printed media are to be bonded together.

In order to attain the above and other object, according to one aspect, the present disclosure provides a non-transitory computer readable storage medium storing a set of program instructions executed by a computer included in an information processing device. The set of program instructions includes: acquiring first print data representing a first image; acquiring second print data representing a second image; outputting a first print instruction to print the first image on a first print medium; outputting a second print instruction to print the second image on a second print medium; and outputting, to a display, a display signal to display a multilayer illustrating image illustrating that the first image and the second image are arranged in layers after the outputting the first print instruction and the outputting the second print instruction are performed.

According to another aspect, the printing device includes a display, a print engine, and a computer. The computer is configured to perform: controlling the print engine to print a first image represented by first print data on a first print medium; controlling the print engine to print a second image represented by second print data on a second print medium; acquiring first information; controlling the display to display a multilayer illustrating image illustrating that the first image and the second image are arranged in layers in a case that the first information is acquired.

With the above structures, the user can understand how multiple print labels which will be printed are to be bonded together.

FIRST EMBODIMENT

A first embodiment will be described below. In the first embodiment, print data is edited on an information terminal and then transmitted to a printing device for printing. The first embodiment describes a process called sequential printing (one-by-one printing) in which the printing device creates a print label in sequence by printing a label to be bonded with other labels each time print data for the label is received from the information terminal.

Overall Configuration of the System

Figure 1:
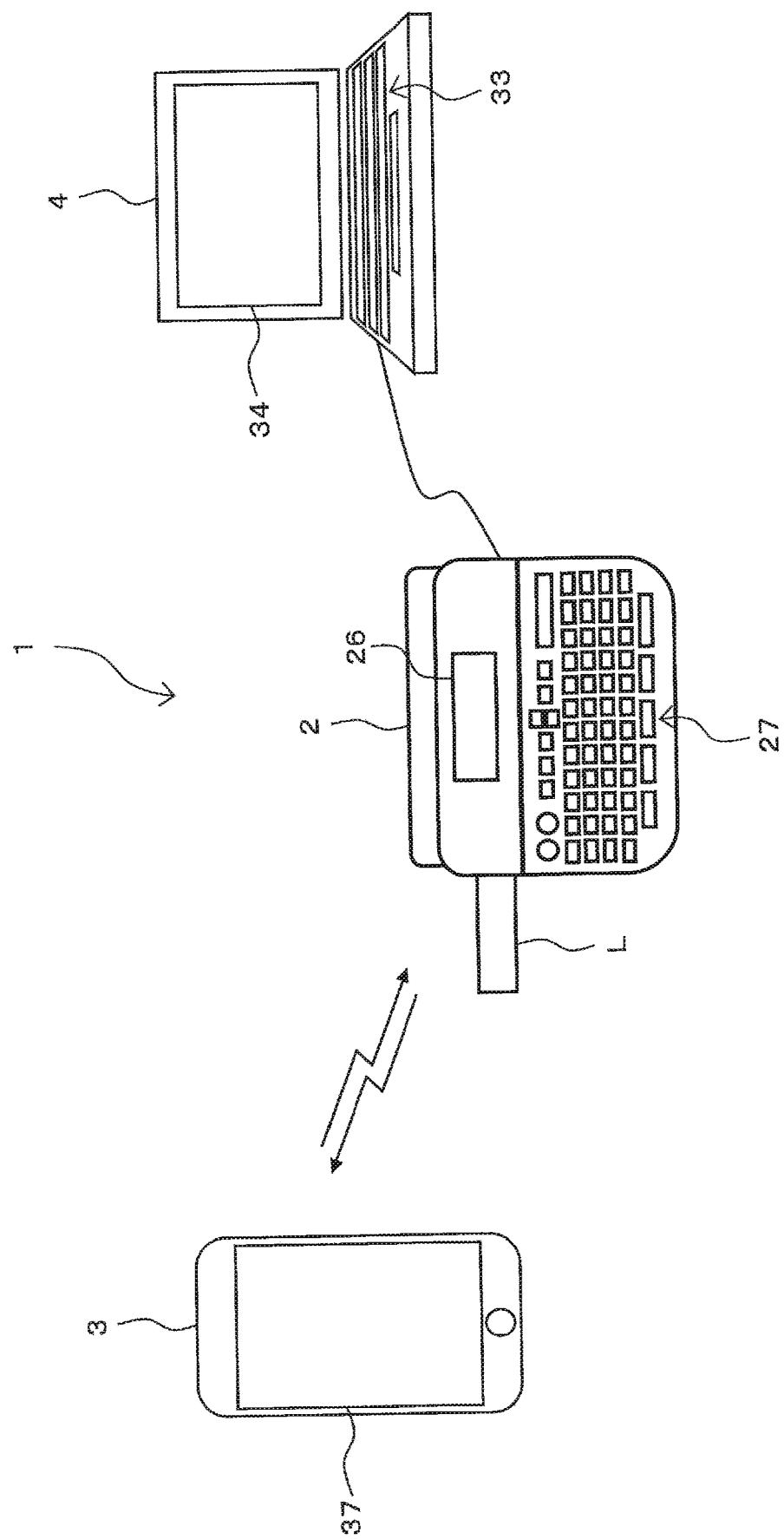
FIG. 1 is an explanatory diagram illustrating an entire configuration of a printing system.

FIG. 1 shows an example of the overall configuration of a printing system 1 according to the first embodiment. In FIG. 1, the printing system 1 has a printing device 2, and information terminals 3 and 4. The printing system 1 may include either one or both of the information terminals 3 and 4. The printing device 2 is a label printer that creates print labels L, for example. The printing device 2 has a display 26, and an input interface (user interface, or operating interface) 27. The information terminal 3 is a portable terminal, for example. The information terminal 3 may be a smartphone having a touchscreen 37, as depicted in FIG. 1; a tablet computer; or the like. The information terminal 4 is a common personal computer, for example, such as a laptop computer provided with an operating interface (input interface, or user interface) 33 and a display 34, as depicted in FIG. 1, or a desktop computer. The information terminals 3 and 4 are both connected to and capable of exchanging information with the printing device 2. As an example, the information terminal 3 is connected to the printing device 2 through a wireless connection while the information terminal 4 is connected to the printing device 2 through a wired connection. Conversely, the information terminal 3 may be connected through a wired connection and the information terminal 4 through a wireless connection.

Information Terminals

Figure 2:
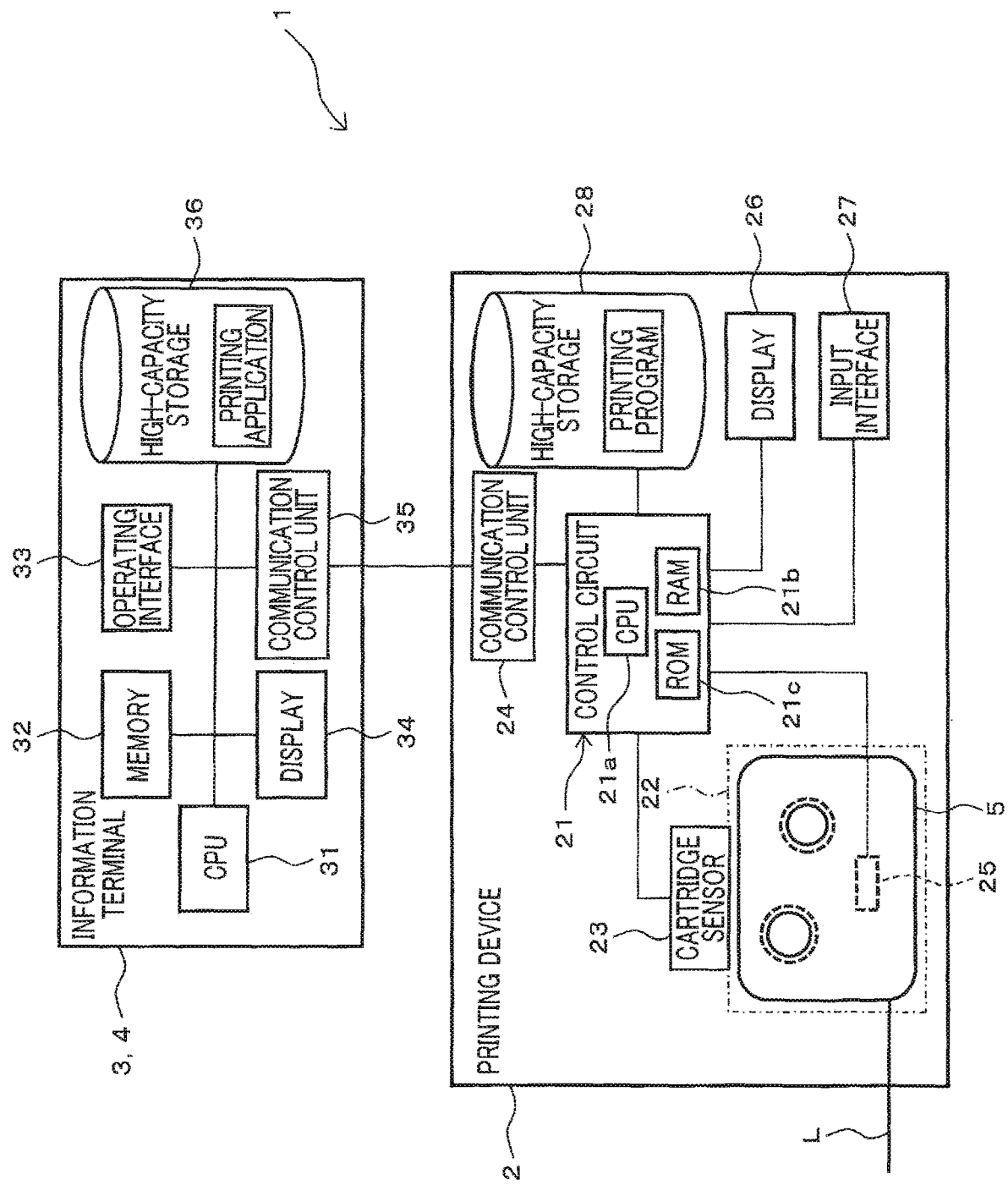
FIG. 2 is a block diagram illustrating hardware configurations of information terminals and a printing device.

FIG. 2 shows an example of the hardware configuration in the information terminals 3 and 4. As shown in FIG. 2, each of the information terminals 3 and 4 is provided with a CPU 31, a memory 32 that includes RAM and ROM, for example, the operating interface 33, the display 34, a communication control unit 35, and a high-capacity storage 36. The information terminals 3 and 4 are both an example of the information processing device and an example of the external device. The CPU 31 in each of the information terminals 3 and 4 is an example of the controller, the computer, and the processor. The display 34 is an example of the display.

The operating interface 33 receives instructions and information inputted by a user. The display 34 displays various information and messages. The functions of the operating interface 33 and the functions of the display 34 are combined to configure the touchscreen 37 in the information terminal 3. The touchscreen 37 is an example of the display. The operating interface 33 may include a keyboard and a mouse in the information terminal 4. The communication control unit 35 controls communications with the printing device 2. The communication control unit 35 includes a network interface (communication interface).

The high-capacity storage 36 stores a printing application for instructing the CPU 31 to perform various steps in the sequences shown in FIGS. 4 and 5 described later, including the editing of print data; various other programs; various data; and the like. The printing application, various programs, various data, and the like may be stored in the memory 32 instead.

The CPU 31 performs various processes and conducts communications with the printing device 2 according to programs stored in ROM or in the high-capacity storage 36, while utilizing RAM in the memory 32 for temporary storage.

Printing Device

FIG. 2 shows an example of the hardware configuration in the printing device 2. As shown in FIG. 2, the printing device 2 has a control circuit 21, a cartridge holder 22, a cartridge sensor 23, a communication control unit 24, a print head 25, the display 26, the input interface 27, and a high-capacity storage 28. The print head 25 is an example of the printer, the print mechanism, and the print engine. The display 26 is an example of the display.

A cartridge 5 is detachably mounted in the cartridge holder 22. The cartridge sensor 23 is disposed in the cartridge holder 22 for detecting the type of cartridge 5 mounted in the cartridge holder 22 according to a suitable known method, such as mechanical, optical, or magnetic detection.

The control circuit 21 includes a CPU 21$a$, a RAM 21$b$, and a ROM 21$c$. The printing device 2 is connected to the communication control unit 35 in each of the information terminals 3 and 4 via the communication control unit 24 so as to be capable of exchanging information with the information terminals 3 and 4. The CPU 21$a$ is an example of the controller, the processor, and the computer.

The input interface 27 (user interface, or operating interface) is configured of a plurality of buttons and the like through which a user inputs instructions and information. The display 26 is a liquid crystal display, for example, for displaying various information and messages. The display 26 has a color display function to be capable of displaying an image of print data in color. The communication control unit 24 controls communications performed with the information terminals 3 and 4. The communication control unit 24 includes a network interface (communication interface).

The high-capacity storage 28 stores a printing program, various data, and the like for instructing the CPU 21$a$ to implement steps in the sequences shown in FIGS. 4 and 5 described later. Alternatively, the printing program, various data, and the like may be stored in the RAM 21$b$ or ROM 21$c$ of the control circuit 21.

Composite Label

In the present embodiment, a plurality of print labels L created with the printing device 2 is overlaid in the thickness direction and bonded together and, in this bonded state, is further fixed to a desired object. Here, the created label in which the plurality of print labels L is overlaid and bonded together is referred to as a composite label. More specifically, different types of cartridges 5 can be used in the printing device 2 for creating a plurality of uniquely different print labels L to be overlaid one on another, as described above, by exchanging the different cartridges 5 that are mounted in the cartridge holder 22. It is possible to create print labels L while varying the printing color printed with the print head 25 by selectively using different types of cartridges 5 having different types of ink ribbons.

However, when the user were to mistake the order in which the print labels L are overlaid one on another, the appearance of the created composite label would differ from the desired appearance. The present embodiment reduces the chance of such mistakes in the superposition order (overlaying order) by displaying images indicating the manner in which the print labels L are to be overlapped. The following description provides an example of creating and overlaying two different print labels L. Note that the number of print labels L to be overlaid is not limited to two but may be three or more print labels L.

Superimposed Images

Figure 3:
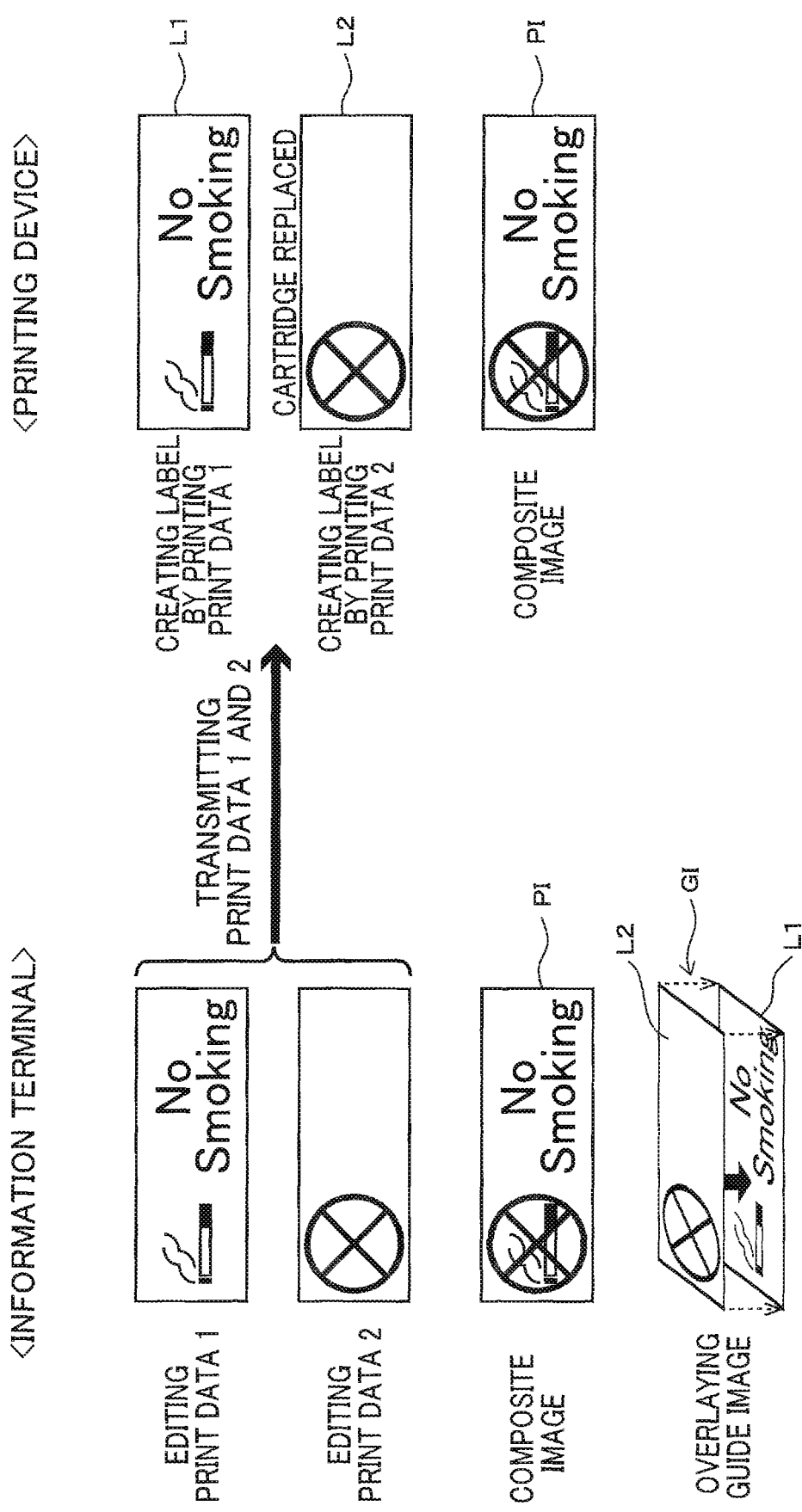
FIG. 3 is an explanatory diagram illustrating examples of superimposed images displayed on displays in the information terminals and the printing device.

FIG. 3 shows examples of superimposed images (multi-layer illustrating images) displayed on the touchscreen 37 of the information terminal 3 or display 34 of the information terminal 4, and an example of a superimposed image (multi-layer illustrating image) displayed on the display 26 of the printing device 2. As shown in FIG. 3, first print data and second print data are edited on the information terminal 3 or 4. In this example, the first print data includes a first image consisting of a black cigarette icon and the black text "No Smoking," and the second print data includes a second image consisting of a red prohibited mark. In FIG. 3, the first print data is denoted "Print Data 1," while the second print data is denoted "Print Data 2." Further, the red prohibited mark is depicted in gray. The same applies to the other drawings.

In this example, the data is superimposed such that the first print data constitutes the bottommost layer and the second print data constitutes the topmost layer. The superimposed images (multilayer illustrating images) displayed on the information terminal 3 or 4 include a composite image PI and an overlaying guide image GI. The composite image PI represents that the image represented by the first print data and the image represented by the second print data are superimposed so that the normal direction of the image of the first print data matches the normal direction of the image of the second print data. The normal direction corresponds to the thickness direction of the print medium when the first print data and the second print data are printed thereon. Thus, in the present disclosure, when describing the image of print data, the term "thickness direction" is used to indicate the normal direction of the image. For example, the composite image PI represents that the image of the first print data and the image of the second print data are superimposed in the thickness direction. The composite image PI reflects the order of superposition. In this example, the image of the second print data in the topmost layer is displayed in its entirety, while portions of the image of the first print data in the bottommost layer that are overlapped by the image of the second print data are not displayed.

The overlaying guide image GI illustrates the procedure for overlaying a print label L1 printed based on the first print data on a print label L2 printed based on the second print data. The print label L1 is an example of the first print medium. The print label L2 is an example of the second print medium. In the example of FIG. 3, the overlaying guide image GI provides a perspective view of the print label L1 and print label L2 with a gap formed between the two print labels. That is, an image of the print label L1 represented by the first print data and an image of the print label L2 represented by the second print data are depicted to be offset in their thickness direction. In other words, the overlaying guide image GI illustrates that the image of the first print data is in a first layer, the image of the second print data is in a second layer, and the first layer and the second layer are arranged with a gap therebetween. Arrows in the overlaying guide image GI indicate that the print label L2 is to be placed on top of the print label L1. Note that the overlaying guide image GI is not limited to a still image but may be an animated image showing the operation of overlaying the print label L2 on the print label L1, for example. The superimposed image (multilayer illustrating image) indicates an image illustrating that the images represented by the plurality of sets of print data are arranged in layers. In the embodiment, the superimposed image (multilayer illustrating image) indicates an image illustrating that the image represented by the first print data at least partially covers the image represented by the second print data.

As illustrated in FIG. 3, the information terminal 3 or the information terminal 4 transmits the first print data and second print data to the printing device 2, and the printing device 2 creates the print label L1 by printing the first print data and creates the print label L2 by printing the second print data. The first and second print data may be transmitted separately or together. A cartridge 5 having a black ink ribbon is used when creating the print label L1 and is replaced with a cartridge 5 having a red ink ribbon when creating the print label L2. The composite image PI is displayed on the printing device 2 as the superimposed image. Though the overlaying guide image is not displayed on the printing device 2, the overlaying guide image GI may be displayed on the display 26 of the printing device 2, similarly to the information terminal 3 or 4.

Control Procedure

An example of the control procedure executed by the CPU 31 of the information terminal 3 or 4 and the CPU 21a of the printing device 2 to achieve the above image displays and the like for the present embodiment will be described with reference to the flowchart in FIG. 4. The control procedure is initiated when the CPU 31 of the information terminal 3 or 4 executes a printing application, for example. More specifically, the process in FIG. 4 begins when the user issues an instruction to print edited print data by using the information terminal 3 or 4. The CPU 21a of the printing device 2 begins the control procedure when the power to the printing device 2 is turned on, for example.

In the printing application used on the information terminal 3 or 4 in this embodiment, the user can change the print editing mode between a "composite mode" and a "normal mode." The composite mode is used when multiple print labels printed based on a plurality of sets of print data are to be overlaid in the thickness direction. The normal mode is selected when print labels printed according to print data are to be used individually rather than being overlaid on other print labels. When editing print data, the user executes the printing application and sets the print editing mode to either the composite mode or the normal mode.

Next, the user edits the print data in the screen displayed based on the selected mode. When the selected print editing mode is the composite mode, the information terminal 3 or 4 stores information in the memory 32 related to the edited print data and the layer order of the edited print data. The description in FIG. 4 assumes that the user has set the information terminal 3 or 4 to the composite mode and has edited first print data with a layer order specifying the bottommost layer and second print data with a layer order specifying the topmost layer.

Figure 4:
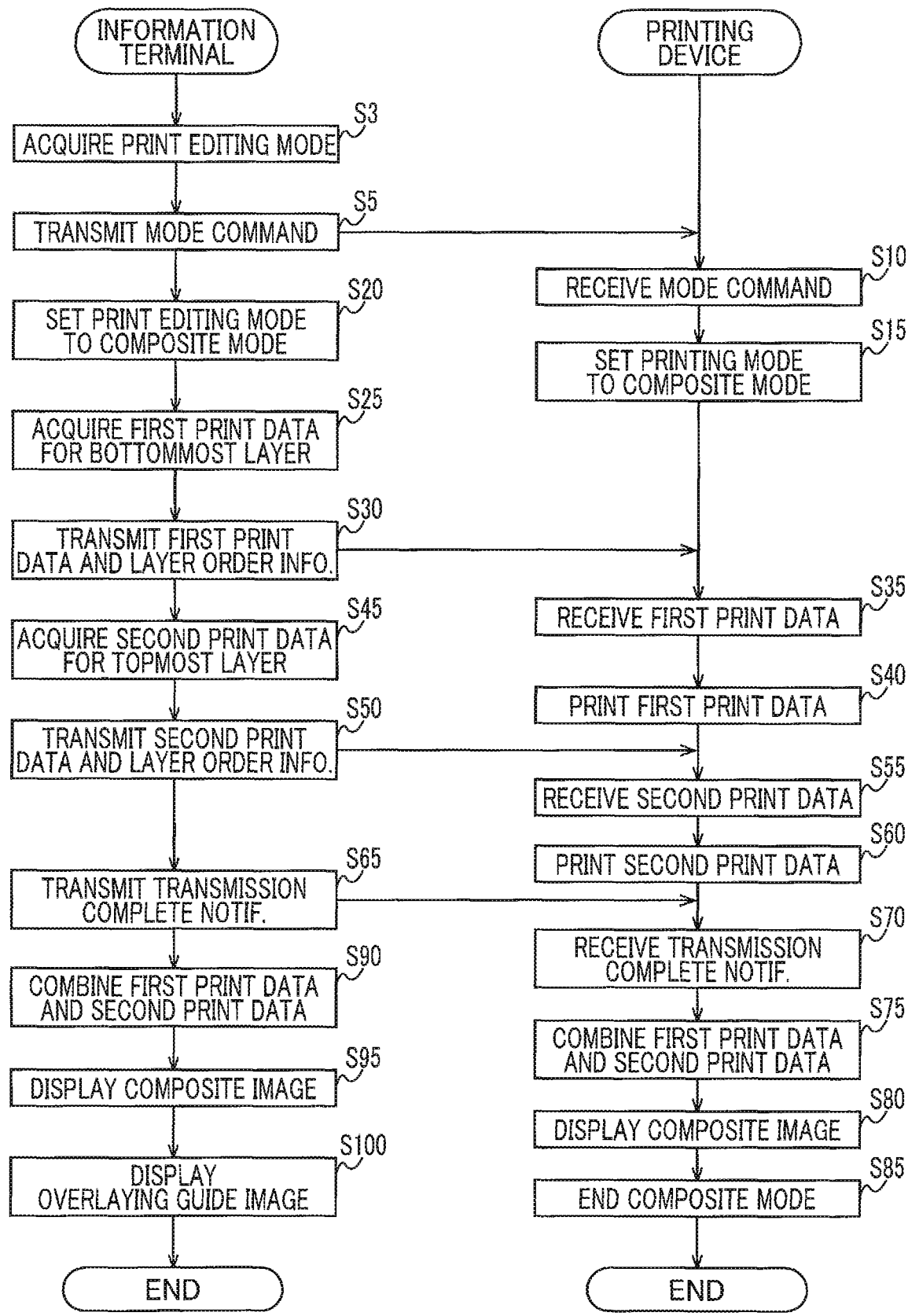
FIG. 4 is a flowchart of a control procedure for a sequential printing in which the printing device create print labels to be overlaid and bonded together in sequence each time print data for the print label is received from the information terminal.

In S3 at the beginning of the control procedure in FIG. 4, the CPU 31 of the information terminal 3 or 4 acquires settings information on the selected print editing mode from the memory 32 and determines that the mode has been set to the composite mode. In S5 the CPU 31 transmits a mode command to the printing device 2 commanding the printing device 2 to switch to the composite mode. The process of S3 is an example of the first information acquisition process executed by the CPU 31. The settings information indicating the composite mode is an example of the composite information, and an example of the first information indicating that the first print data and the second print data are used for printing the first print label L1 and the second print label L2 respectively, and the first and second print labels L1 and L2 are overlaid in the thickness direction.

In S10 the CPU 21a of the printing device 2 receives the mode command from the information terminal 3 or 4. The process of S10 is an example of the first information acquisition process executed by the CPU 21a. In S15 the CPU 21a sets a printing mode for the printing device 2 to the composite mode.

In the meantime, in S20 the CPU 31 of the information terminal 3 or 4 sets the print editing mode for the information terminal 3 or 4 to the composite mode. In S25 the CPU 31 acquires the first print data and layer order information indicating the order in which the image represented by the first print data is to be superimposed from the memory 32. In this example, the layer order is the bottommost layer. That is, a combination of the layer order information and the first print data indicates that the first print data is data to be used for the bottommost layer. The process of S25 is an example of the first print data acquisition process executed by the CPU 31. The process of S25 is a layer order information acquisition process. In S30 the CPU 31 transmits the first print data and the layer order information to the printing device 2. Transmission of the first print data and the layer order information to the printing device 2 instructs the printing device 2 to print the first print data for the bottommost layer. The process of S30 is an example of the first print instruction outputting process.

In S35 the CPU 21a of the printing device 2 receives the first print data and the layer order information from the information terminal 3 or 4. The process of S35 is an example of the first print data acquisition process executed by the CPU 21a. The process of S35 is an example of the layering order acquisition process.

In S40 the CPU 21a outputs a printing instruction instructing the print head 25 to print the image of the first print data. By printing the first print data with the print head 25, the CPU 21a produces the print label L1. The process of S40 is an example of the first print instruction outputting process executed by the CPU 21a. The process of S40 is an example of the first print process.

In the meantime, in S45 the CPU 31 of the information terminal 3 or 4 acquires the second print data and the layer order information indicating the order in which the image represented by the second print data is to be superimposed from the memory 32. In this example, the layer order is the topmost layer. That is, a combination of the layer order information and the second print data indicates that the second print data is data to be used for the topmost layer. The process of S45 is an example of the second print data acquisition process executed by the CPU 31. The process of S45 is an example of the layering order acquisition process.

In S50 the CPU 31 transmits the second print data and the layer order information for the second print data to the printing device 2. Transmission of the first print data and the layer order information to the printing device 2 instructs the printing device 2 to print the first print data for the topmost layer. The process of S50 is an example of the second print instruction outputting process executed by the CPU 31.

In S55 the CPU 21a of the printing device 2 receives the second print data and the layer order information from the information terminal 3 or 4. The process of S55 is an example of the second print data acquisition process executed by the CPU 21a. The process of S55 is an example of the layering order acquisition process.

In S60 the CPU 21a outputs a printing instruction to the print head 25 to print the image of the second print data. By printing the second print data with the print head 25, the CPU 21a produces the print label L2. The process of S60 is an example of the second print instruction outputting process executed by the CPU 21a. The process of S60 is an example of the second print process.

In the meantime, in S65 the CPU 31 of the information terminal 3 or 4 transmits a transmission complete notification to the printing device 2 for notifying the printing device 2 that print data for all print labels to be overlaid and bonded together has been sent to the printing device 2.

In S70 the CPU 21a of the printing device 2 receives the transmission complete notification from the information terminal 3 or 4. The process of S70 is an example of the completion notification acquisition process.

In S75 the CPU 21a combines the first print data and second print data to generate image data representing the composite image PI. When generating the image data representing the composite image PI, the CPU 21a references the layer order information for each of the first print data and the second print data so that the resulting image illustrates the image of the second print data for the topmost layer superimposed on top of the image of the first print data for the bottommost layer. The process of S75 is an example of the data generation process executed by the CPU 21a.

In S80 the CPU 21a displays the composite image PI based on the image data generated in S75 on the display 26. The process of S80 is an example of the display signal outputting process executed by the CPU 21a and the example of the display process. As described above, the CPU 21a starts the series of processes S75 and S80 in response to reception of the transmission complete notification in S70. In other words, the transmission complete notification prompts the printing device 2 to perform the series of processes S75 and S80. The transmission complete notification is an example of the display signal. In S65 the CPU 31 of the information terminal 3 or 4 may transmit an instruction to display the composite image PI to the printing device 2 with the transmission complete notification. In this case, the CPU 21a starts the series of processes S75 and S80 in response to reception of this display instruction. That is, the display instruction prompts the printing device 2 to perform the series of processes S75 and S80. The display instruction is an example of the display signal.

In S85 the CPU 21a ends the composite mode. Here, the CPU 21a automatically advances to S85 a prescribed time after the composite image PI was displayed in S80, for example. This completes the control procedure performed by the CPU 21a.

In the meantime, in S90 the CPU 31 of the information terminal 3 or 4 combines the first print data and second print data to generate image data representing the composite image PI and image data representing the overlaying guide image GI. When generating the image data of the composite image PI, the CPU 31 references the layer order information for each of the first print data and second print data so that the resulting image illustrates the image of the second print data for the topmost layer superimposed on top of the image data of the first print data for the bottommost layer. When generating the image data of the overlaying guide image GI, the CPU 31 also references the layer order information for each of the first print data and second print data so that the resulting image illustrates the procedure for overlaying the print label L2 printed according to the second print data for the topmost layer on top of the print label L1 printed according to the first print data for the bottommost layer. In S90 the CPU 31 acquires the layer order information for each of the first print data and second print data from the memory 32. The composite image PI and the overlaying guide image GI are examples of the overlap image (multi-layer illustrating image and superimposed image). The process of S90 is an example of the data generation process executed by the CPU 31. The process of S90 is an example of the overlaying procedure acquisition process.

In S95 the CPU 31 displays the composite image PI based on the image data generated in S90 on the display 34 or touchscreen 37. In S100 the CPU 31 displays the overlaying guide image GI based on the image data generated in S90 on the display 34 or touchscreen 37. This ends the control procedure executed by the CPU 31. The processes of S95 and S100 are an example of the display signal outputting process executed by the CPU 31.

Effects of the First Embodiment

As described above in the first embodiment, after images have been printed on the print labels L1 and L2, the print labels L1 and L2 are overlaid one on another to be used as a single composite label having a user-desired appearance. In S35 and S55, the CPU 21a provided in the printing device 2 of the present embodiment acquires first print data representing a first image and second print data representing a second image, respectively.

Through steps S40 and S60, the CPU 21a in the printing device 2 executes a printing process by transmitting a printing instruction to the print head 25 for printing the acquired first and second print data to create the print labels L1 and L2. After transmitting these printing instructions, in S80 the CPU 21a outputs display signals to the display 26 and, based on these display signals, the display 26 displays a superimposed image showing the first image and second image superimposed in their thickness direction.

According to this embodiment, the printing device 2 displays a superimposed image on the display 26 showing the first image and second image overlaid in the thickness direction. This facilitates the user in understanding how the print label L1 and the print label L2 are to be bonded together. This embodiment can also reduce errors in the order that labels are bonded together. Further, since the printing device 2 displays the superimposed image at a timing after outputting printing instructions for printing the first print data and the second print data, the user can easily understand how the print label L1 and print label L2 are to be bonded together.

One feature of the present embodiment is that the printing device 2 displays an image on the display 26 illustrating how the print labels L1 and L2 are to be overlaid. This display facilitates the user in understanding how multiple print labels L1 and L2 are to be bonded together after the labels have been sequentially printed on the printing device 2.

Another feature of the present embodiment is that the CPU 21a provided in the printing device 2 acquires the first and second print data described above from the information terminal 3 or 4 in steps S35 and S55. The CPU 21a also acquires a transmission completion notification in S70. The transmission completion notification was sent by the information terminal 3 or 4 once transmission of the first and second print data is complete. Thus, the CPU 21a executes the display process in S80 described above after acquiring the transmission complete notification in S70.

According to the present embodiment, the CPU 21a displays a superimposed image on the display 26 after the transmission of print data from the information terminal 3 or 4 is complete. In this way, the printing device 2 can display a superimposed image after receiving both the first print data and second print data. The user can also see how the printed print labels L1 and L2 should be bonded together at a timing during or immediately after their printing.

Further, the CPU 31 provided in the information terminal 3 or 4 transmits printing instructions to the printing device 2 in S30 and S50 for instructing the printing device 2 to print the first and second print data for the print labels L1 and L2. After transmitting these printing instructions, the CPU 31 outputs display signals to the display 34 or touchscreen 37 in S95 and S100. Based on these display signals, a superimposed image illustrating the first image and second image superimposed in their thickness direction are displayed on the display 34 or touchscreen 37. This facilitates the user in understanding how the print label L1 and the print label L2 are to be bonded together and can also suppress the occurrence of errors in the order of superposition.

Another feature of the present embodiment is that an image showing the procedure for overlaying the print labels L1 and L2 is displayed on the touchscreen 37 of the information terminal 3 or the display 34 of the information terminal 4 as a superimposed image. By displaying an image of the labels in the process of being bonded together rather than their appearance after having been bonded together, the user can more easily understand how the labels should be bonded and the order of their superposition. Further, by displaying the images on the information terminal 3 or 4, which is convenient for carrying, the user can view the images while performing the actual operations for overlaying and bonding the print labels L1 and L2 together. Therefore, this embodiment improves convenience and workability.

Another feature of the present embodiment is that the overlaying guide image GI as the example of the superimposed image displayed on the touchscreen 37 of the information terminal 3 or the display 34 of the information terminal 4 for producing a label by overlaying and bonding the print labels L1 and L2 together shows the image of the print label L1 and the image of the print label L2 separated from each other in their thickness direction. This three-dimensional display enables the user to recognize the correct method of overlapping the labels more easily.

Another feature of the present embodiment is that the CPU 31 provided in the information terminal 3 or 4 executes step S5, and the CPU 21a provided in the printing device 2 executes step S10. That is, in S5 the CPU 31 transmits a mode command that the CPU 21a acquires in S10. The mode command includes information indicating whether the print labels L1 and L2 printed according to the first and second print data are to be overlaid in their thickness direction for use as a composite label, as described above. This process enables the CPU 21a to set the printing mode of the printing device 2 to the composite mode so that the process for producing a composite label can be executed smoothly.

Another feature of the present embodiment is that the CPU 21a of the printing device 2 executes step S75 and the CPU 31 of the information terminal 3 or 4 executes step S90 to generate superimposed data based on the first and second print data. This process enables the superimposed image to be smoothly displayed on the display 26 of the printing device 2 and the touchscreen 37 of the information terminal 3 or display 34 of the information terminal 4.

Another feature of the present embodiment is that the CPU 31 of the information terminal 3 or 4 executes steps S30 and S50 while the CPU 21a of the printing device 2 executes steps S35 and S55 in order that the CPU 21a can acquire layer order information indicating the order in which the first and second print data are superimposed. Based on the acquired superposition order, the CPU 21a can generate data for the superimposed images described above precisely and accurately.

Second Embodiment

Next, a second embodiment will be described. In the second embodiment, the printing device 2 performs a process called "collective" printing in which the printing device 2 first receives the print data for all labels to be overlaid and bonded together from the information terminal 3 or 4, and then produces the print labels all at once. The configuration of the printing system, superimposed images, and the like according to the second embodiment are identical to those in the first embodiment and, hence, a description of these will be omitted.

Control Procedure

An example of the control procedure executed by the CPU 31 of the information terminal 3 or 4 and the CPU 21a of the printing device 2 according to the second embodiment will be described with reference to the flowchart in FIG. 5, wherein steps identical to those in FIG. 4 are designated with the same step numbers to avoid duplicating description.

Figure 5:
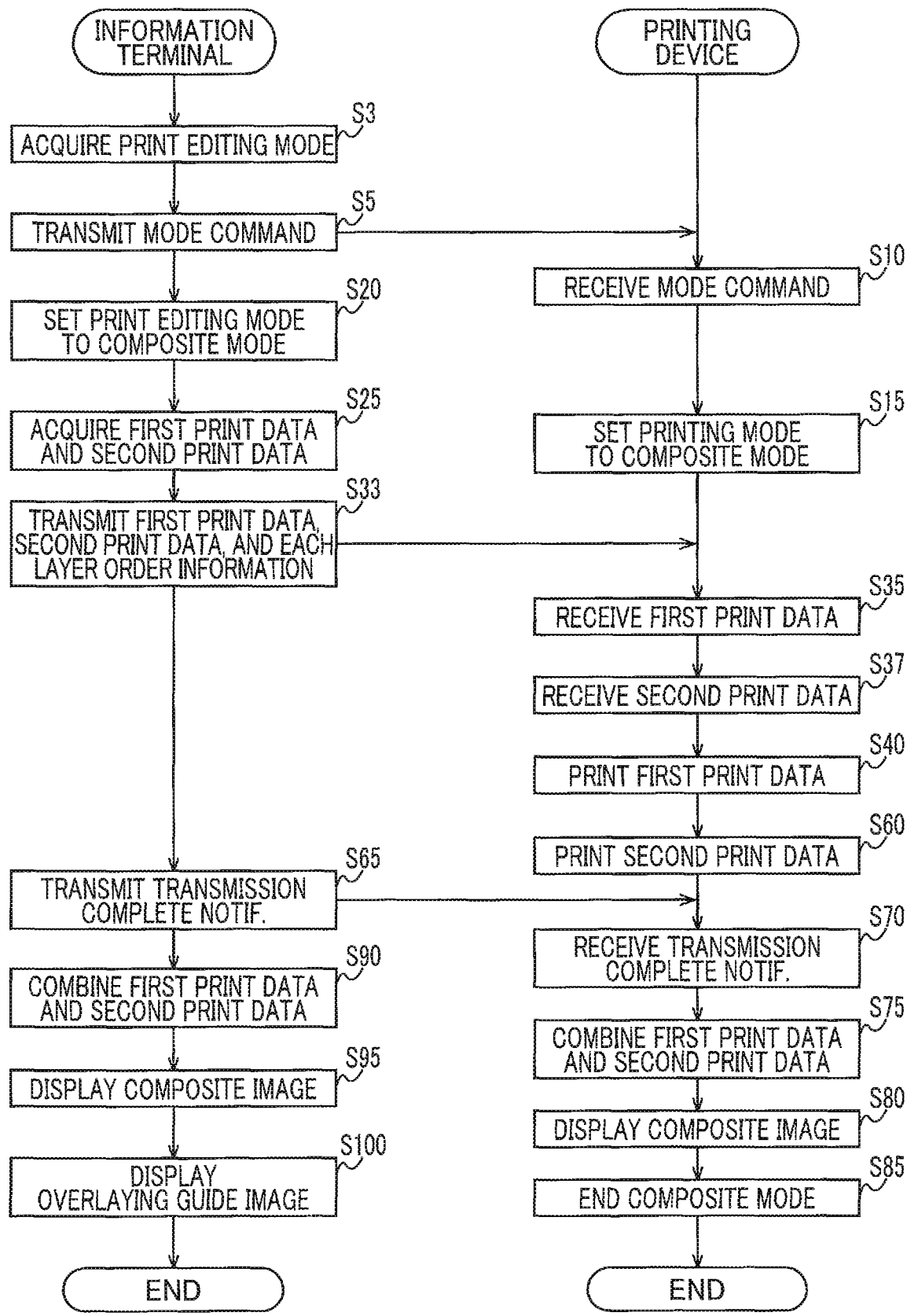
FIG. 5 is a flowchart of a control procedure for a collective printing in which a printing device first receives print data for all labels to be overlaid and bonded together from an information terminal, and then creates the print labels all at once.

Steps S3-S20 in FIG. 5 are identical to those in FIG. 4 and will not be described here.

In S25 the CPU 31 of the information terminal 3 or 4 acquires from the memory 32 first print data, second print data, and layer order information specifying the order in which the image of the first print data and the image of the second print data are to be overlaid. In this example, the layer order for the first print data is the bottommost layer and the layer order for the second print data is the topmost layer. The process of S25 is an example of the first print data acquisition process and second print data acquisition process both executed by the CPU 31.

In S33 the CPU 31 transmits the first print data, second print data, and each layer order information specifying the order of superposition for a corresponding one of the first print data and the second print data to the printing device 2. Transmission of the first print data, the second print data, and each layer order information to the printing device 2 instructs the printing device 2 to print the first print data for the bottommost layer and the second print data for the topmost layer. The process of S33 is an example of the first print instruction outputting process and the second print data outputting process.

In S35 the CPU 21a of the printing device 2 receives the first print data and its layer order information from the information terminal 3 or 4. In S37 the CPU 21a receives the second print data and its layer order information from the information terminal 3 or 4. In this way, the CPU 21a successively receives first print data and the like and second print data and the like from the information terminal 3 or 4.

In S40 the CPU 21a creates the print label L1 by controlling the print head 25 to print the first print data. In S60 the CPU 21a creates the print label L2 by controlling the print head 25 to print the second print data. In this way, the CPU 21a successively creates the print label L1 according to the first print data and the print label L2 according to the second print data.

The subsequent process in steps S65-S100 is identical to that described above in FIG. 4 and will not be repeated here.

Effects of the Second Embodiment

The second embodiment described above can obtain the same effects described in the first embodiment.

Third Embodiment

Next, a third embodiment will be described. The third embodiment covers a case in which the display 26 of the printing device 2 can only display monochrome images.

Superimposed Images

Figure 6:
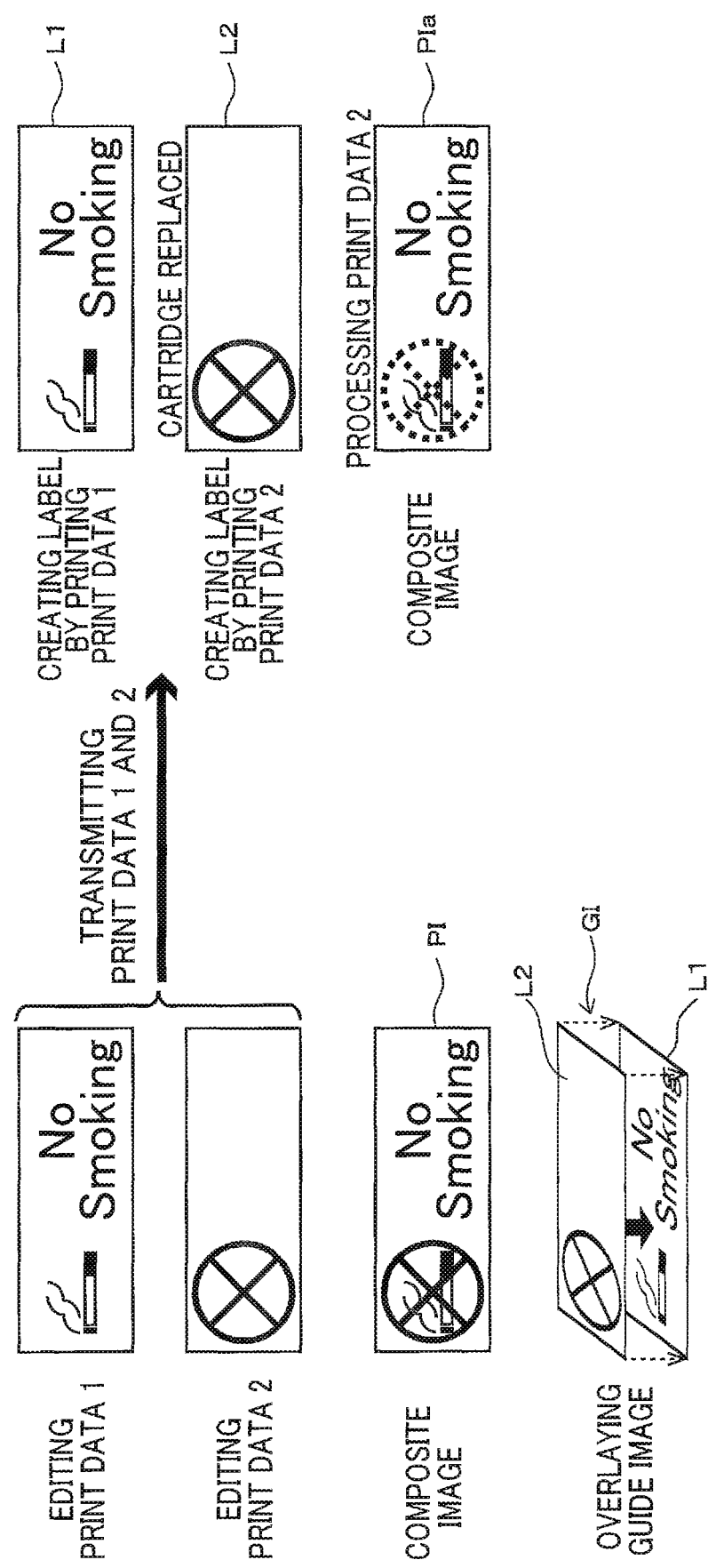
FIG. 6 is an explanatory diagram illustrating examples of superimposed images displayed on the displays in the information terminals and the printing device.

FIG. 6 shows examples of superimposed images displayed on the touchscreen 37 of the information terminal 3 or the display 34 of the information terminal 4 and on the display 26 of the printing device 2. The composite image PI and the overlaying guide image GI displayed on the information terminal 3 or 4 are identical to those in the first and second embodiments described above. However, since the display 26 of the printing device 2 can only display images in monochrome, the printing device 2 first processes (modifies) the second image in the second print data representing the red prohibited mark and then displays a composite image PIa as the superimposed image. In the example of FIG. 6, the image of the red prohibited mark is converted to an image of the prohibited mark represented by black dotted lines.

Areas of the image included in the second print data that are subjected to processing are areas in colors other than black and white. However, the areas of the image in the second print data that are subjected to processing may be areas having luminance or lightness greater than a corresponding threshold, areas bright colors, or areas that are dissimilar from black. Further, the portions of the image subjected to processing need not be converted to dotted lines but may be converted into any form distinguishable from the other images, such as dashed lines, chain lines, shading, and hatching. A conversion table or the like may be prepared for mapping each color to a type of image processing, such as converting red images to dotted lines and blue images to dashed lines.

As with the information terminal 3 or 4, the printing device 2 may also display the overlaying guide image GI. In this case, the image representing the red prohibited mark included in the second print data is processed as described above and displayed in the overlaying guide image GI.

Control Procedure

Figure 7:
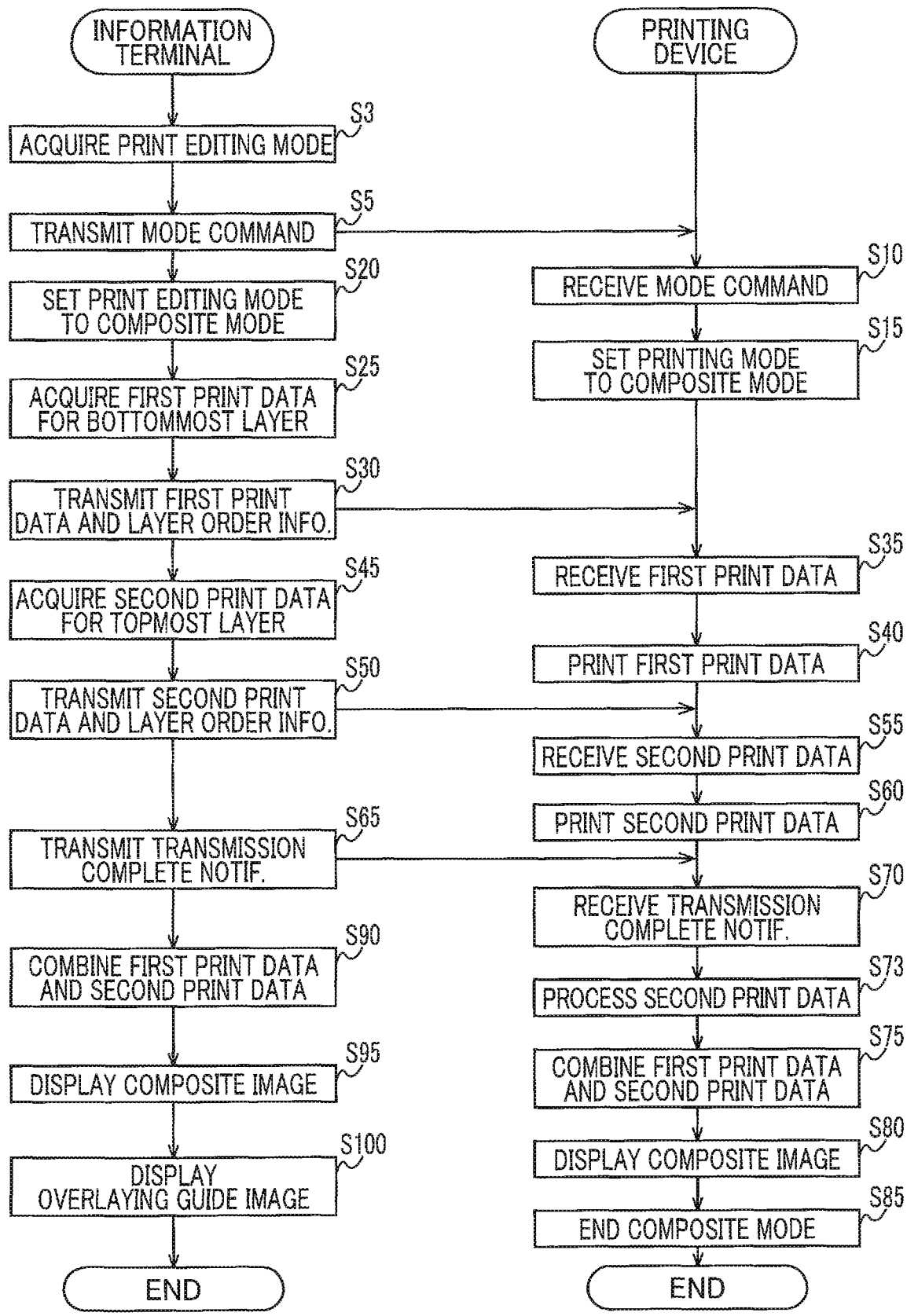
FIG. 7 is a flowchart of a control procedure for a sequential printing in which a printing device create print labels to be overlaid and bonded together in sequence each time print data for the print label is received from an information terminal.

Next, an example of the control procedure executed by the CPU 31 of the information terminal 3 or 4 and the CPU 21a of the printing device 2 to realize the above image displays and the like for the third embodiment will be described with reference to the flowchart in FIG. 7. FIG. 7 gives an example of a control procedure used when performing sequential printing, and steps identical to those in FIG. 4 of the first embodiment are designated with the same reference numerals to avoid duplicating description.

Steps S3-S70 are identical to those in FIG. 4 of the first embodiment and, hence, a description of these steps will not be repeated here.

In S73 the CPU 21a of the printing device 2 converts the image in the second print data representing the red prohibited mark to an image of the prohibited mark configured of black dotted lines, for example. The process of S73 is an example of the image process for processing the second image included in the second print data.

In S75 the CPU 21a combines the first print data and the second print data that was processed in S73 to generate the composite image PIa.

The remaining steps S80-S100 are identical to those in FIG. 4 and will be omitted here. In the third embodiment, the CPU 21a starts the series of processes S73, S75 and S80 in response to reception of the transmission complete notification in S70. In other words, the transmission complete notification prompts the printing device 2 to perform the series of processes S73, S75 and S80. The transmission complete notification is an example of the display signal. In S65 the CPU 31 of the information terminal 3 or 4 may transmit an instruction to process the second print data for the composite image PI and display the composite image PI to the printing device 2 with the transmission complete notification. In this case, the CPU 21a starts the series of processes S73, S75 and S80 in response to reception of this display instruction. That is, the display instruction prompts the printing device 2 to perform the series of processes S73, S75 and S80. The display instruction is an example of the display signal.

The printing device 2 may perform collective printing (all-at-once printing) in this embodiment. In such a case, a process identical to that in step S73 may be performed prior to S75 in the flowchart of FIG. 5 described above, for example.

Effects of the Third Embodiment

To display a superimposed image including the first image included in the first print data and the second image included in the second print data in this embodiment, the second image is subjected to processing in S73, and a superimposed image using the processed data is displayed on the display 26. By performing a prescribed process on the second image in this way, the superimposed image can be displayed in a manner that enables the user to distinguish colors between the first image and the second image, even when the display 26 of the printing device 2 has no color function and can only display monochrome images, for example.

Fourth Embodiment

Next, a fourth embodiment will be described. The fourth embodiment describes a case in which the printing device 2 is a standalone device, whereby the user performs both editing and printing of print data on the printing device 2.

Superimposed Image

Figure 8:
FIG. 8 is an explanatory diagram illustrating examples of superimposed images displayed on the display in the printing device.
Figure 8:
Figure 8:
Figure 8:
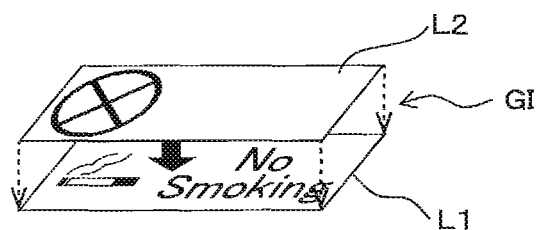

FIG. 8 shows a superimposed image displayed on the display 26 of the printing device 2 in the fourth embodiment. As shown in FIG. 8, the first print data is edited and printed on the printing device 2 to create the print label L1. Similarly, the second print data is edited and printed on the printing device 2 to create the print label L2. As in the example of the first through third embodiments described above, the first print data includes a first image having a black cigarette icon and the black text "No Smoking," and the second print data includes a second image comprising a red prohibited mark. As the order of superposition, the first print data constitutes the bottommost layer, and the second print data constitutes the topmost layer. A composite image PI and an overlaying guide image GI formed by combining the first and second print data are displayed on the display 26 of the printing device 2 as the superimposed images.

Exterior View of the Printing Device

Figure 9:
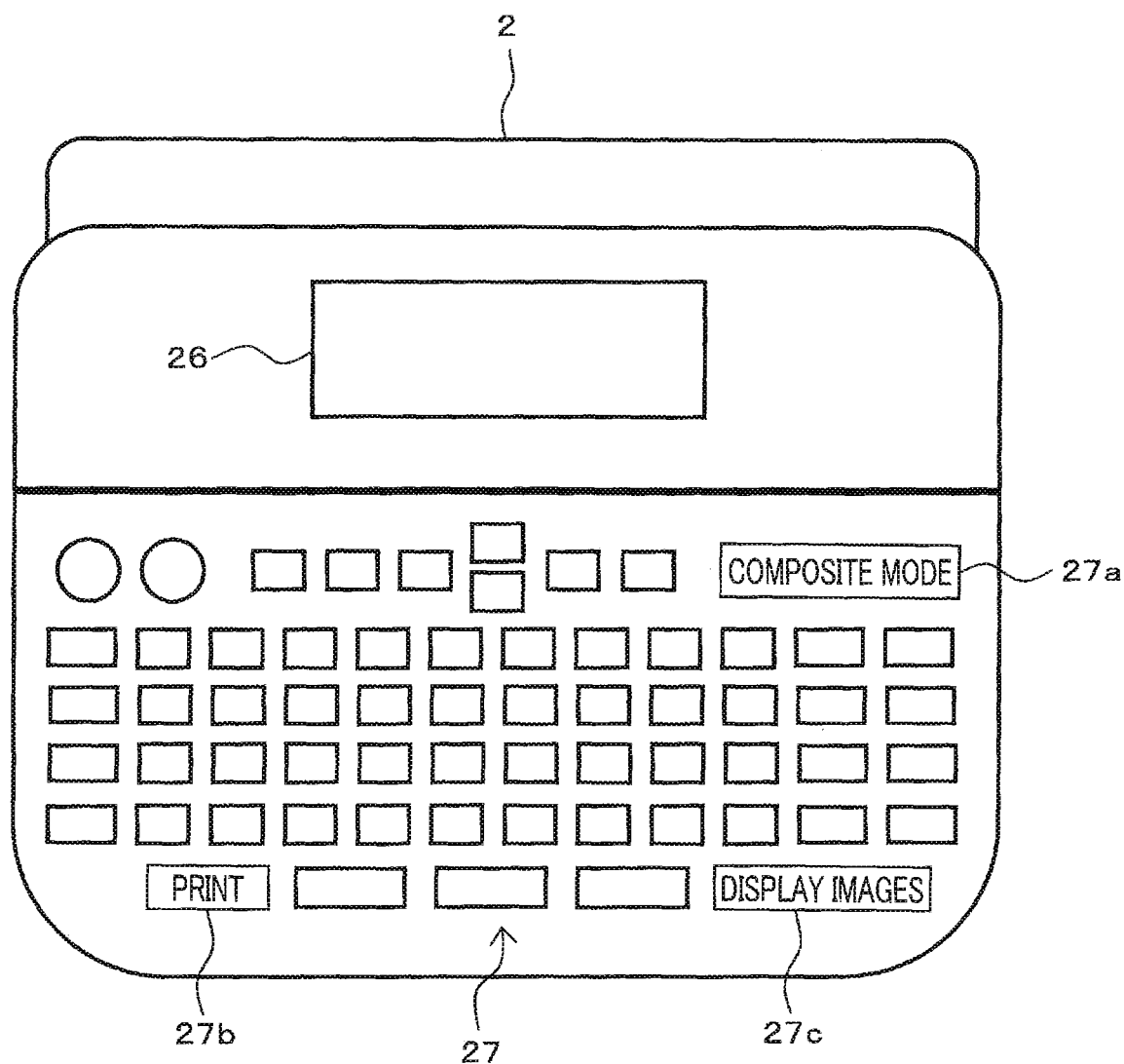
FIG. 9 is a plan view illustrating an appearance of a printing device.

FIG. 9 shows an exterior view of the printing device 2 according to the fourth embodiment. As shown in FIG. 9, the printing device 2 has the display 26 and the input interface 27. The display 26 is a liquid crystal display, for example. As in the first and second embodiments described above, the printing device 2 in the fourth embodiment has a color display function for displaying print data in color. The input interface 27 is configured of a plurality of buttons, including a Composite Mode button 27a, a Print button 27b, and a Display Images button 27c. The Composite Mode button 27a enables the user to switch the printing mode of the printing device 2 from the normal mode to the composite mode. The Print button 27b enables the user to instruct the printing device 2 to print edited print data in order to create a print label L. The Display Images button 27c enables the user to instruct the printing device 2 to display the composite image PI and the overlaying guide image GI.

Control Procedure

Figure 10:
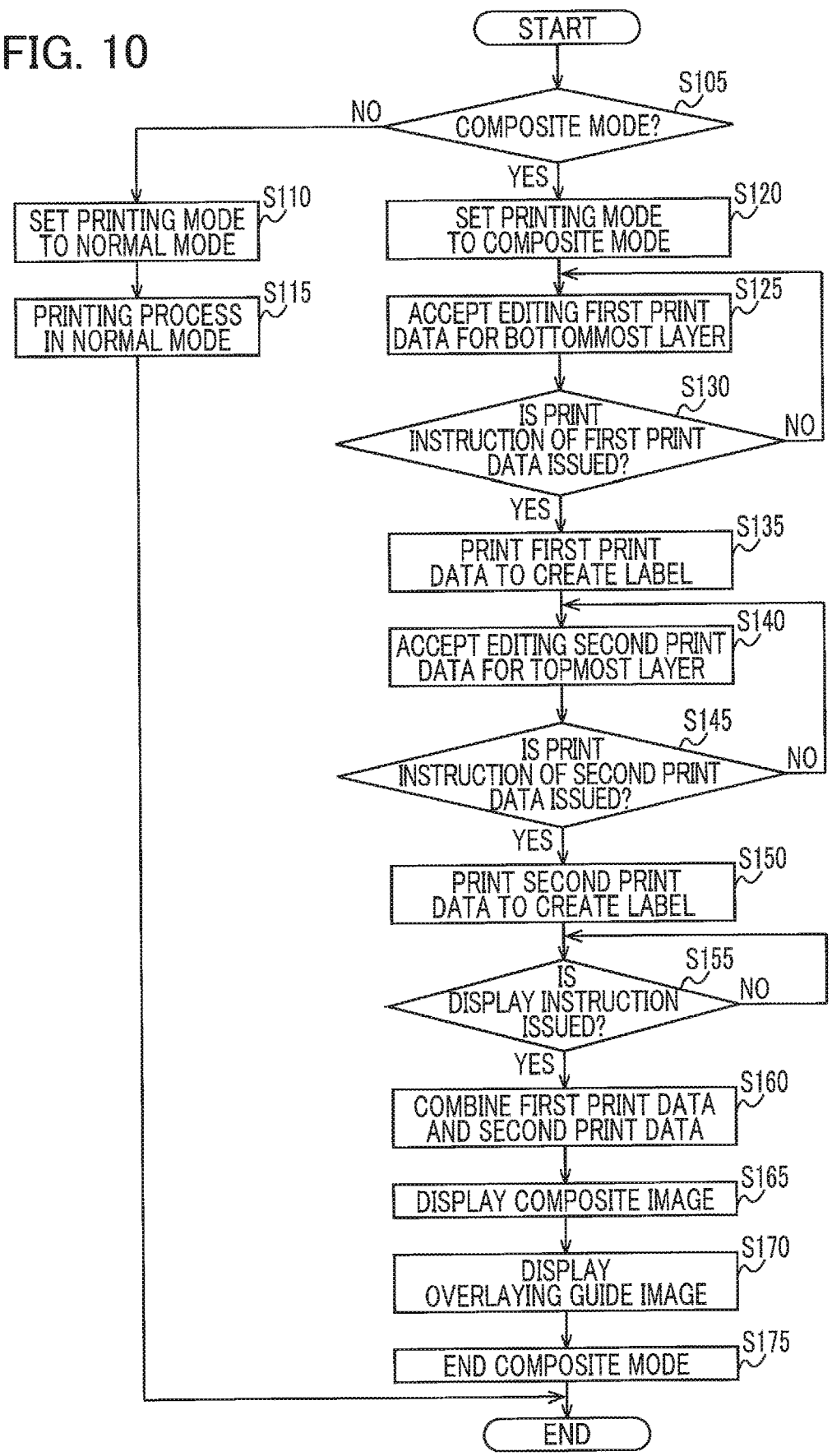
FIG. 10 is a flowchart of a control procedure for a sequential printing.

Next, an example of the control procedure executed by the CPU 21a of the printing device 2 for achieving the above image displays and the like for the fourth embodiment will be described with reference to the flowchart in FIG. 10. FIG. 10 is a sample control procedure used when performing sequential printing. The CPU 21a initiates the control procedure in FIG. 10 when the power to the printing device 2 is turned on, for example.

In S105 of FIG. 10, the CPU 21a of the printing device 2 determines whether the user performed an operation to switch the printing mode to the composite mode, i.e., whether the Composite Mode button 27a was pressed. The CPU 21a advances to S110 when determining that an operation to switch to the composite mode was not performed (S105: NO).

In S110 the CPU 21a sets the printing mode to the normal mode.

In S115 the CPU 21a executes a printing process in the normal mode. In the printing process of the normal mode, the printing device 2 accepts instructions to edit print data, and prints the edited print data when the user issues a printing instruction to create a print label L. Subsequently, the CPU 21a ends the control procedure of FIG. 10.

However, when the CPU 21a determines in S105 that the user performed an operation to switch to the composite mode (S105: YES), the CPU 21a advances to S120.

In S120 the CPU 21a sets the printing mode of the printing device 2 to the composite mode. At this time, the CPU 21a acquires settings information of the mode from the RAM 21b, for example, specifying that the composite mode is set. The process of S120 is an example of the first information acquisition process.

In S125 the CPU 21a accepts from the user instructions for editing the first print data and a layer order setting indicating the superposition order of the first print data. In this example, the layer order will be set to the bottommost layer.

In S130 the CPU 21a determines whether the user issued an instruction to print the first print data, i.e., whether the Print button 27b was pressed. When the CPU 21a determines that a print instruction was not issued (S130: NO), the CPU 21a returns to S125 and continues accepting editing instructions for the first print data. Once the CPU 21a determines that a print instruction was issued (S130: YES), the CPU 21a advances to S135.

In S135 the CPU 21a creates the print label L1 by controlling the print head 25 to print the image of the first print data. To perform the print in S135 for producing the print label L1, the CPU 21a acquires the first print data from the RAM 21b or the high-capacity storage 28 and transmits a printing instruction to the print head 25 to print the first print data. The process of S135 is an example of the first print data acquisition process. In S135 the CPU 21a transmits to the print head 25 a print instruction to print the first print data on the print label L1. This process of S135 is an example of the first print instruction process. The process of S135 is an example of the first print process.

In S140 the CPU 21a accepts from the user editing instructions for editing the second print data and a setting for the layer order representing the superposition order of the second print data. In this example, the layer order will be the topmost layer.

In S145 the CPU 21a determines whether the user issued an instruction to print the second print data, i.e., whether the Print button 27b was pressed. When the CPU 21a determines that a print instruction was not issued (S145: NO), the CPU 21a returns to S140 and continues to accept editing instructions for the second print data. Once the CPU 21a determines that a print instruction was issued (S145: YES), the CPU 21a advances to S150.

In S150 the CPU 21a creates the print label L2 by controlling the print head 25 to print the image of the second print data. To perform the print in S150 for producing the print label L2, the CPU 21a acquires the second print data from the RAM 21b or the high-capacity storage 28 and transmits a printing instruction to the print head 25 instructing the print head 25 to print the second print data. The process of S150 is an example of the second print data acquisition process. In S150 the CPU 21a transmits to the print head 25 a print instruction to print the second print data on the print label L2. This process of S150 is an example of the second print instruction process. The process of S150 is an example of the second print process.

In S155 the CPU 21a determines whether the user issued an instruction to display the superimposed images, i.e., whether the Display Images button 27c was pressed. The CPU 21a repeatedly performs the determination in S155 while an instruction to display the superimposed images has not been issued (S155: NO) and advances to S160 when an instruction to display the superimposed images is issued (S155: YES).

In S160 the CPU 21a combines the first print data and second print data to generate the image data of the composite image PI and the image data of the overlaying guide image GI. The CPU 21a references the layer order information for each of the first print data and second print data to generate the composite image PI as an image showing the image of the second print data for the topmost layer superimposed on top of the image of the first print data for the bottommost layer. The CPU 21a also references the layer order information for each of the first print data and second print data to generate the overlaying guide image GI as an image illustrating the procedure for overlaying the print label L2 printed according to the second print data for the topmost layer on top of the print label L1 printed according to the first print data for the bottommost layer. The process of S160 is an example of the data generation process. In S160 the CPU 21a acquires this layer order information in S160 from the RAM 21b or the high-capacity storage 28. This process of S160 is an example of the layering order acquisition process for acquiring information on a layering order of the first print data and the second print data.

In S165 the CPU 21a displays the composite image PI generated in S160 on the display 26.

In S170 the CPU 21a displays the overlaying guide image GI generated in S160 on the display 26. Here, the user may alternate between displaying the composite image PI and overlaying guide image GI in the processes of S165 and S170 by pressing the Display Images button 27c, or the displays may switch automatically after a prescribed time has elapsed. Alternatively, the CPU 21a may perform just one of the processes in S165 and S170, in which case only one of the composite image PI or overlaying guide image GI will be displayed on the display 26. The composite image PI and the overlaying guide image GI are examples of the superimposed image. The processes of S165 and S170 are examples of the display signal outputting process and examples of the display process.

In S175 the CPU 21a terminates the composite mode. Here, the CPU 21a may automatically advance to S175 to terminate the composite mode a prescribed time after displaying the overlaying guide image GI in S170 or may execute the process in S175 when the user performs a prescribed operation (e.g., presses a Normal Mode button (not shown)). This ends the control procedure performed by the CPU 21a.

The printing device 2 may perform collective printing in the fourth embodiment. In such a case, the CPU 21a may execute steps S125 and S140 in the flowchart of FIG. 10 consecutively, for example, in order to accept editing instructions for a plurality of sets of print data altogether. After subsequently receiving a print instruction from the user, the CPU 21a then executes steps S135 and S150 consecutively in order to print the labels altogether.

The fourth embodiment described above can obtain the same effects described in the first embodiment.

MODIFICATIONS

The present disclosure is not limited to the first to fourth embodiments described above. The modifications are made without departing from the essence and the technical concept thereof.

In the embodiments described above, the user edits print data for each label and sets the layer order indicating the superposition order for the print data, but the present invention is not limited to this arrangement. For example, the layer order may be preset as the order in which the print data was edited on the information terminal 3 or 4 or may be preset as the order in which the printing device 2 received the print data. In such cases, there is no need to set the layer order or to execute a procedure for transmitting and receiving layer order information.

In the embodiments described above, the superimposed images are displayed after the printing device 2 has printed the print data to produce the print labels L, but the timing for displaying the superimposed images is not limited to a timing following printing of the print data. The superimposed images may be displayed before the print data is printed instead. As an example, when the printing device 2 receives print data from the information terminal 3 or 4 and executes a print based on this print data, the superimposed images may be generated and displayed after the printing device 2 receives the print data and before the printing device 2 creates the print labels L. Specifically, the superimposed images may be displayed before the creation of the print labels L is complete, or before starting printing the first print data.

In the third embodiment described above, only the second print data is processed. However, the first print data and second print data may be both subjected to processing when the first print data also includes areas in colors other than black or white, for example.

When using a standalone printing device 2 as in the fourth embodiment, the following process may be performed when the display 26 of the printing device 2 can only display monochrome images, as in the third embodiment described above. When performing sequential printing, for example, the printing device 2 may process the second print data as in S73 of FIG. 7 described above prior to performing step S160 in the flowchart of FIG. 10. When performing collective printing, the printing device 2 may consecutively execute S125 and S140 in the flowchart shown in FIG. 10, and subsequently may consecutively execute S135 and S150 after receiving a print instruction from the user. In addition, the printing device 2 may process the second print data as in S73 of FIG. 7 described above prior to performing step S160.

In the first and second embodiments, in S75 the CPU 21a of the printing device 2 generates the image data representing the composite image PI and in S80 controls the display 26 to display the composite image PI. However, the CPU 21a may not perform the process of S75. In this case, the CPU 31 of the information terminal 3 or 4 transmits the image data representing the composite image PI, which is generated in S90 toward the display 26 of the printing device 2, and in S80 the CPU 21a of the printing device 2 displays the composite image PI based on the image data received from the CPU 31. That is, the image data representing the composite image PI prompts the printing device 2 to perform the process of S80. Here, the image data representing the composite image PI transmitted toward the display 26 from the CPU 31 is an example of the display signal. Similarly, in the third embodiment, the CPU 21a may perform neither the process of S73 nor S75. In this case after the process of S65, the CPU 31 may process the second print data similarly to S73, generate the image data of the composite image PI by using the first print data and the processed second print data similarly to S75, and transmit the generated the image data of the composite image PI to the printing device 2. That is, the image data representing the composite image PI prompts the printing device 2 to perform the process of S80. Here, the image data representing the composite image PI transmitted toward the display 26 from the CPU 31 is an example of the display signal.

Flowcharts shown in FIGS. 4, 5, 7 and 10 disclosed in the embodiments do not limit the steps indicated therein. Steps may be added or deleted, or their order may be rearranged without departing from the essence and technical concept of the present disclosure.

The technical elements described above in the embodiments and their variations may be used in any suitable combination.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A non-transitory computer readable storage medium storing a set of program instructions executed by a computer included in an information processing device configured to control a printing device, the set of program instructions when executed by the computer causing the information processing device to perform:
   (a) acquiring first print data representing a first image;
   (b) acquiring second print data representing a second image;
   (c) outputting a first print instruction to print the first image on a first print medium to the printing device;
   (d) outputting a second print instruction to print the second image on a second print medium to the printing device;
and
   after both (c) the outputting the first print instruction to the printing device is executed and (d) the outputting the second print instruction to the printing device is executed, (e) outputting, to a display, a display signal to display an overlaying guide image illustrating that the first print medium on which the first image is printed and the second print medium on which the second image is printed are arranged with a gap in a thickness direction and illustrating how the first print medium on which the first image is printed and the second print medium on which the second image is printed are overlaid and bonded together, the thickness direction being a direction of a thickness of the first print medium.

2. The non-transitory computer readable storage medium according to claim 1,
   wherein the set of program instructions when executed by the computer causes the information processing device to further perform:
   acquiring composite information indicating that the first print medium on which the first image is printed and the second print medium on which the second image is printed are to be overlaid one on another.

3. The non-transitory computer readable storage medium according to claim 1,
   wherein the display signal is outputted to the display provided in the printing device.

4. The non-transitory computer readable storage medium according to claim 1,
   wherein the overlaying guide image represents a procedure for overlaying the first print medium on which the first image is printed and the second print medium on which the second image is printed one on another.

5. The non-transitory computer readable storage medium according to claim 1,
   wherein the set of program instructions when executed by the computer causes the information processing device to further perform:
   generating the overlaying guide image data representing the overlaying guide image by using the first print data and the second print data.

6. The non-transitory computer readable storage medium according to claim 5, wherein the set of program instructions when executed by the computer causes the information processing device to further perform:
   acquiring order information on an order in which the first print medium on which the first image is printed and the second print medium on which the second image is printed are arranged in the thickness direction,
   wherein the generating generates the overlaying guide image data so that the overlaying guide image illustrates that the first print medium on which the first image is printed and the second print medium on which the second image is printed are arranged in the thickness direction in the order specified by the order information.

7. The non-transitory computer readable storage medium according to claim 1,
   wherein the set of program instructions when executed by the computer causes the information processing device to further perform:
   processing the second print data so that the processed second print data represents a modified second image obtained by modifying the second image; and
   generating the display signal to display the overlaying guide image by using the first print data and the processed second print data.

8. The non-transitory computer readable storage medium according to claim 1,
   wherein the display signal is outputted to the display provided in the information processing device.

9. The non-transitory computer readable storage medium according to claim 1,
   wherein the overlaying guide image is a guide image representing how the first print medium on which the first image is printed and the second print medium on which the second image is printed are to be overlaid and bonded one on another.

10. The non-transitory computer readable storage medium according to claim 1,
    wherein the overlaying guide image represents that among a plurality of lines, each line with a respective arrow extends in the thickness direction from the second print medium on which the second image is printed to the first print medium on which the first image is printed.

11. An information processing device configured to control a printing device comprising:
    a computer configured to perform:
    (a) acquiring first print data representing a first image;
    (b) acquiring second print data representing a second image;
    (c) outputting a first print instruction to print the first image on a first print medium to the printing device;
    (d) outputting a second print instruction to print the second image on a second print medium to the printing device; and
    after (c) the outputting the first print instruction to the printing device is executed and (d) the outputting the second print instruction to the printing device is executed, (e) outputting, to a display, a display signal to display an overlaying guide image illustrating that the first print medium on which the first image is printed and the second print medium on which the second image is printed are arranged with a gap in a thickness direction and illustrating how the first print medium on which the first image is printed and the second print medium on which the second image is printed are overlaid and bonded together, the thickness direction being a direction of a thickness of the first print medium.

12. The information processing device according to claim 11,
wherein the overlaying guide image is a guide image representing how the first print medium on which the first image is printed and the second print medium on which the second image is printed are to be overlaid and bonded one on another.

13. A printing device comprising:
a display;
a print engine; and
a computer configured to perform:
(a) controlling the print engine to print a first image represented by first print data on a first print medium;
(b) controlling the print engine to print a second image represented by second print data on a second print medium; and
after (a) the controlling the print engine to print the first image is performed, and (b) the controlling the print engine to print the second image is performed, (c) controlling the display to display an overlaying guide image illustrating that the first print medium on which the first image is printed and the second print medium on which the second image is printed are arranged with a gap in a thickness direction and illustrating how the first print medium on which the first image is printed and the second print medium on which the second image is printed are overlaid and bonded together, the thickness direction being a direction of a thickness of the first print medium.

14. The printing device according to claim 13, wherein the computer is configured to further perform:
acquiring the first print data and the second print data from an external device; and
acquiring a transmission complete notification of the first print data and the second print data from the external device,
wherein the controlling the display is performed after the transmission completion notification is acquired.

15. The printing device according to claim 13,
wherein the computer is configured to further perform acquiring first information;
wherein the first information includes composite information indicating that the first print medium on which the first image is printed and the second print medium on which the second image is printed are to be overlaid one on another.

16. The printing device according to claim 13,
wherein the overlaying guide image is a guide image representing how the first print medium on which the first image is printed and the second print medium on which the second image is printed are to be overlaid and bonded one on another.

17. A printing device comprising:
a display;
a print engine;
a communication control unit and
a computer configured to perform:
(a) receiving first print data by the communication control unit;
(b) controlling the print engine to print a first image represented by the first print data on a first print medium;
(c) receiving second print data by the communication control unit;
(d) receiving a setting by the communication control unit, the setting accepted by the computer, the setting indicating that a first print label, with the first image, and a second print label, with a second image, are to be overlaid in a thickness direction;
(e) controlling the print engine to print the second image represented by the second print data on a second print medium;
after (d) receiving the setting, by the computer, (f) controlling the display to display an overlaying guide image illustrating that the first print medium on which the first image is printed and the second print medium on which the second image is printed are arranged with a gap in the thickness direction and illustrating how the first print medium on which the first image is printed and the second print medium on which the second image is printed are overlaid and bonded together, the thickness direction being a direction of a thickness of the first print medium.

18. The printing device according to claim 17,
wherein the overlaying guide image is a guide image representing how the first print medium on which the first image is printed and the second print medium on which the second image is printed are to be overlaid and bonded one on another.

19. The printing device according to claim 17,
wherein the setting includes an arrangement order of the first print medium on which the first image is printed and the second print medium on which the second image is printed,
wherein the overlaying guide image illustrates that the first print medium on which the first image is printed and the second print medium on which the second image is printed are arranged in the arrangement order.

* * * * *